United States Patent
Wu (10) Patent No.: US 9,864,932 B2
(45) Date of Patent: Jan. 9, 2018

(54) VISION-BASED OBJECT DETECTOR

(71) Applicant: Conduent Business Services, LLC, Dallas, TX (US)

(72) Inventor: Wencheng Wu, Rochester, NY (US)

(73) Assignee: Conduent Business Services, LLC, Dallas, TX (US)

( * ) Notice: Subject to any disclaimer, the term of this patent is extended or adjusted under 35 U.S.C. 154(b) by 437 days.

(21) Appl. No.: 14/686,212

(22) Filed: Apr. 14, 2015

(65) Prior Publication Data

US 2016/0307069 A1  Oct. 20, 2016

(51) Int. Cl.
| | | |
|---|---|---|
| G06T 7/00 | (2017.01) |
| G06K 9/00 | (2006.01) |
| G06K 9/62 | (2006.01) |
| H04N 7/18 | (2006.01) |
| G06T 7/254 | (2017.01) |

(52) U.S. Cl.
CPC ....... G06K 9/6255 (2013.01); G06K 9/00771 (2013.01); G06T 7/254 (2017.01); H04N 7/181 (2013.01); G06T 2207/10016 (2013.01); G06T 2207/10024 (2013.01); G06T 2207/20081 (2013.01); G06T 2207/20224 (2013.01); G06T 2207/30196 (2013.01); G06T 2207/30232 (2013.01); G06T 2207/30236 (2013.01); G06T 2207/30264 (2013.01)

(58) Field of Classification Search
CPC ............................ G06K 9/00771; G06T 7/254
USPC .......................................................... 348/77
See application file for complete search history.

(56) References Cited

U.S. PATENT DOCUMENTS

| | | | | |
|---|---|---|---|---|
| 2013/0272573 | A1* | 10/2013 | Feris | G06K 9/00771 |
| | | | | 382/103 |
| 2014/0201126 | A1* | 7/2014 | Zadeh | G06K 9/627 |
| | | | | 706/52 |
| 2015/0242707 | A1* | 8/2015 | Wilf | G06K 9/00302 |
| | | | | 382/159 |

(Continued)

OTHER PUBLICATIONS

Saenko et al. "Adapting Visual Category Models to New Domains"; UC Berkeley EECS and ICSI, Berkeley, CA; 2010.*

(Continued)

*Primary Examiner* — William C Vaughn, Jr.
*Assistant Examiner* — Stuart Bennett
(74) *Attorney, Agent, or Firm* — MH2 TECHNOLOGY LAW GROUP LLP (57) ABSTRACT

A method for detecting an object includes acquiring a first video of a source domain where a vision-based object detector is trained. Change detection is performed on the first video to collect one or more first localized, unlabeled sample images from the source domain. A second video is acquired of a target domain where the vision-based object detector is used. Change detection is performed on the second video to collect one or more second localized, unlabeled sample images from the target domain. A domain adaptation parameter is determined based on, one or more domain shift properties between the one or more first localized, unlabeled sample images from the source domain and the one or more second localized, unlabeled sample images from the target domain. The vision-based object detector is adapted to be used for object detection in the target domain based on the domain adaptation parameter.

14 Claims, 7 Drawing Sheets

(56) References Cited

U.S. PATENT DOCUMENTS

2015/0356345 A1* 12/2015 Velozo ............... G06K 9/00228
382/103

OTHER PUBLICATIONS

Felzenswalb et al. "Object Detection with Discriminatively Trained Part-Based Models" IEEE Transactions on Pattern Analysis and Machine Intelligence, vol. 32, No. 9 Sep. 2010.*

* cited by examiner

VISION-BASED OBJECT DETECTOR

TECHNICAL FIELD

The present teachings relate generally to vision-based object detection and, more particularly, to systems and methods for vision-based object detection via change detection and unsupervised domain adaptation.

BACKGROUND

Parking demand management systems are used to determine whether one or more vehicles are occupying a predetermined space. For example, parking demand management systems may make on-street parking occupancy determinations, parking lot occupancy determinations, and parking garage occupancy determinations. Such systems may use vision-based object (e.g., vehicle) detection as a step in the determination process. Vision-based object detection achieves accurate results with proper training and application of object classifiers.

To achieve high accuracy in vehicle detection, the classifier is applied to the same scenarios for which it is trained. For example, the classifier may be trained for detection at a particular site, during particular conditions (e.g., clear skies, daytime etc.), with a particular camera position. This is referred to as the source domain. The classifier may then be applied at the same site, during the same conditions, with the same camera position, to yield accurate vehicle detection results. This is referred to as the target domain.

This constraint in training and applying is often referred to as same domain application (i.e., source domain=target domain). When the site or conditions of the target domain changes (i.e., source domain target domain), the classifier needs to be either re-trained or domain adaptation is required to maintain accurate performance. Re-training is an effective way to maintain accurate performance if the user has sufficient time to collect and label a plurality of samples. Domain adaptation is a method to reduce the effort needed for re-training. What is needed, therefore, is an improved system and method for object detection when the target domain is different from the source domain.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for detecting an object is disclosed. The method includes acquiring a first video of a source domain where a vision-based object detector is trained. Change detection is performed on the first video to collect one or more first localized, unlabeled sample images from the source domain. A second video is acquired of a target domain where the vision-based object detector is used. Change detection is performed on the second video to collect one or more second localized, unlabeled sample images from the target domain. A domain adaptation parameter is determined based on one or more domain shift properties between the one or more first localized, unlabeled sample images from the source domain and the one or more second localized, unlabeled sample images from the target domain. The vision based object detector is adapted to be used for object detection in the target domain based on the domain adaptation parameter.

A non-transitory computer-readable medium is also disclosed. The medium stores instructions that, when executed by at least one processor of a computing system, cause the computing system to perform operations. The operations include acquiring a first video of a source domain where a vision-based object detector is trained. Change detection is performed on the first video to collect one or more first localized, unlabeled sample images from the source domain. A second video is acquired of a target domain where the vision-based object detector is used. Change detection is performed on the second video to collect one or more second localized, unlabeled sample images from the target domain. A domain adaptation parameter is determined based on one or more domain shift properties between the one or more first localized, unlabeled sample images from the source domain and the one or more second localized, unlabeled sample images from the target domain. The vision-based object detector is adapted to be used for object detection in the target domain based on the domain adaptation parameter.

A computing system is also disclosed. The computer system includes one or more processors and a memory system including one, or more nor-transitory computer-readable media storing instructions that, when executed by at least one of the one or more processors, cause the computing system to perform operations. The operations include acquiring a first video of a source domain, where a vision-based object detector is trained. Change detection is performed on the first video to collect one or more first localized, unlabeled sample images from the source domain. A second video is acquired of a target domain where the vision-based object detector is used. Change detection is performed on the second video to collect one or more second localized, unlabeled sample images from the target domain. A domain adaptation parameter is determined based on one or more domain shift properties between the one or more first localized, unlabeled sample images from the source domain and the one or more second localized, unlabeled sample images from the target domain. The vision-based object detector is adapted to be used for object detection in the target domain based on the domain adaptation parameter.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Figure 1:
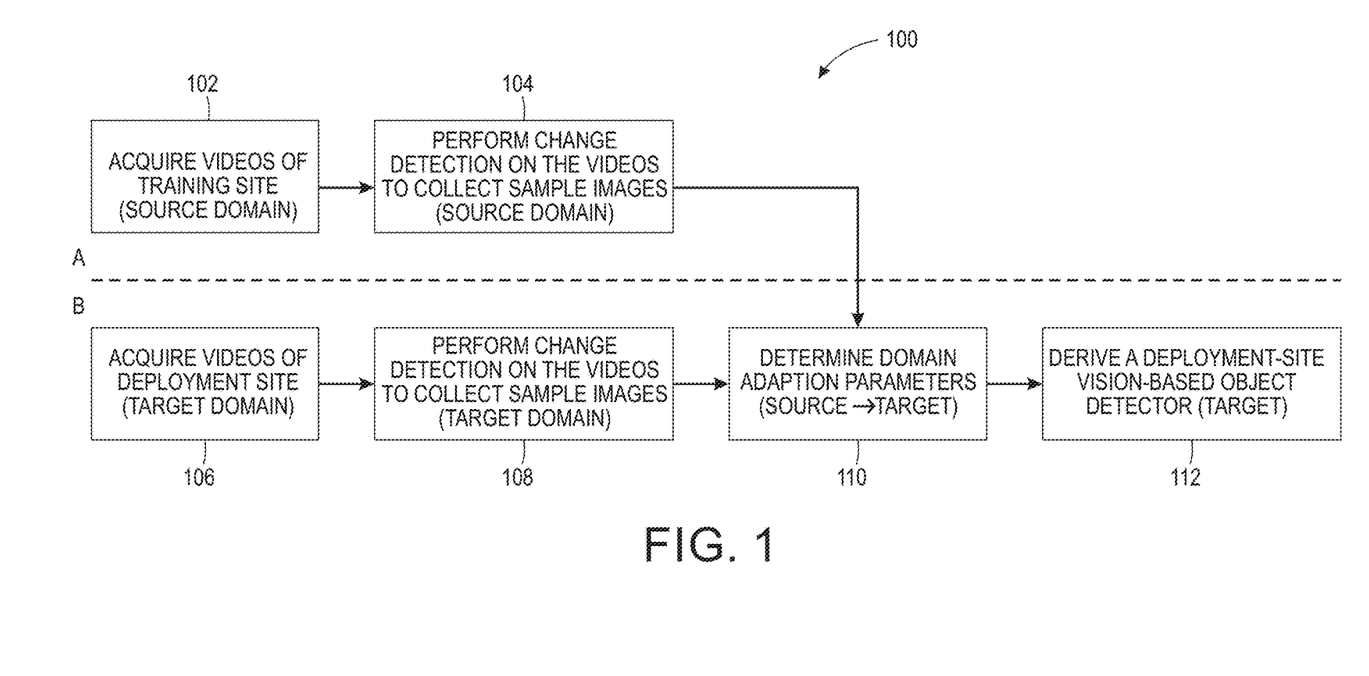
FIG. 1 depicts a flow chart of a method for detecting an object, according to one or more embodiments disclosed.

FIG. 1 depicts a flow chart of a method 100 for detecting an object, according to one or more embodiments disclosed. The method 100 may include two phases, which are described in greater detail below with reference to FIGS. 2-8. The first phase (A) may include capturing of an initial representation of a source domain (e.g., a training site). The second phase (B) includes an adaptation for a target domain (e.g., deployment site). Phase B may occur for each deployment site and/or for the same site but when conditions change (e.g., the camera is moved, the weather differs from weather during training, etc.). The two phases may be used to adapt a detector to accurately detect objects in the target domain without fully retraining the detector.

This method 100 may belong to the category of unsupervised domain adaptation ("UDA"). Domain Adaptation is a field associated with machine learning and transfer learning. This scenario arises when a user or computer aims at learning from a source data distribution a well performing model on a different (but related) target data distribution. For instance one of the tasks of the common spam filtering problem includes adapting a model from one user (the source distribution) to a new one who receives significantly different emails (the target distribution). As used herein, "domain adaptation" refers to adapting an object detector trained in a source domain to an object detector suitable for target domain. As such, domain adaptation is "unsupervised" when there are no known labelled sample images or data available for the adaptation.

Figure 2:
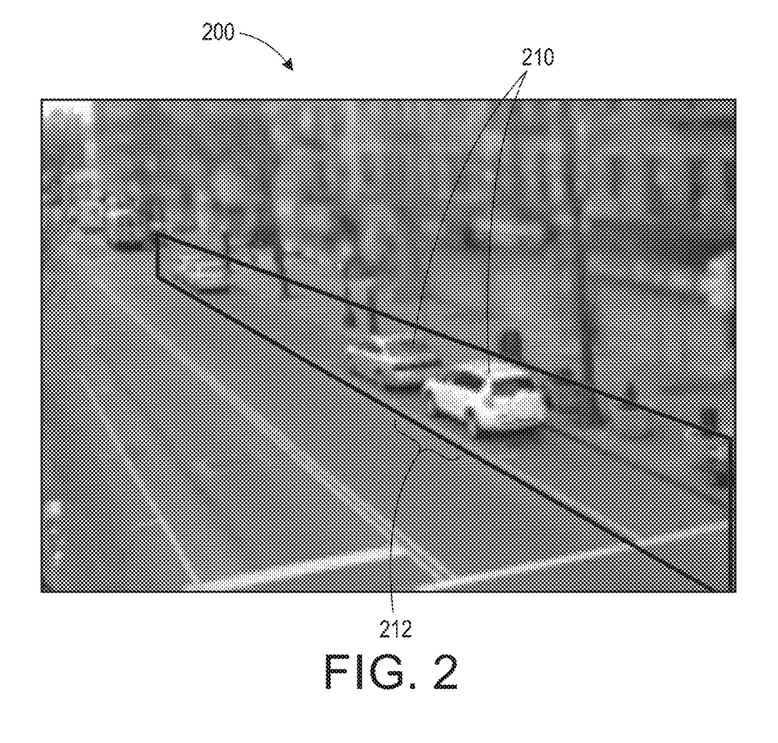
FIG. 2 depicts an image of a source domain where a vision-based object detection system is trained, according to one or more embodiments disclosed.

The method 100 may begin by acquiring one or more videos of a source domain (e.g., training site) where a vision-based object detection system is trained, as at 102. FIG. 2 depicts an illustrative image 200 of a source domain where the vision-based object detection system is trained, according to one or more embodiments disclosed. As shown, the objects 210 are vehicles, and the source domain is a segment of on-street parking. The video of the source domain may show one or more of the vehicles 210 coming and going. For example, the video may show a vehicle 210 pull into a parking spot/stall 212, remain there for 3 hours, and then drive away leaving the parking spot/stall 212 vacant. As will be appreciated, in other embodiments, the objects and source domains may vary. For example, the objects may be people (e.g., faces), and the source domain may be a classroom.

Figure 3A:
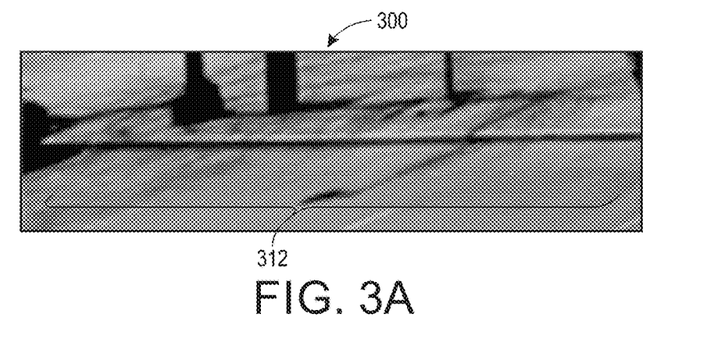
FIGS. 3A, 3B, and 3C depict illustrative images of "poorly-localized," unlabeled sample images from the source domain, according to one or more embodiments disclosed.
Figure 3B:
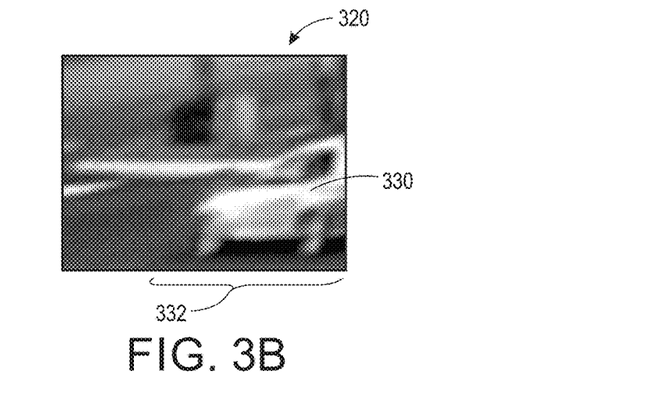
Figure 3C:
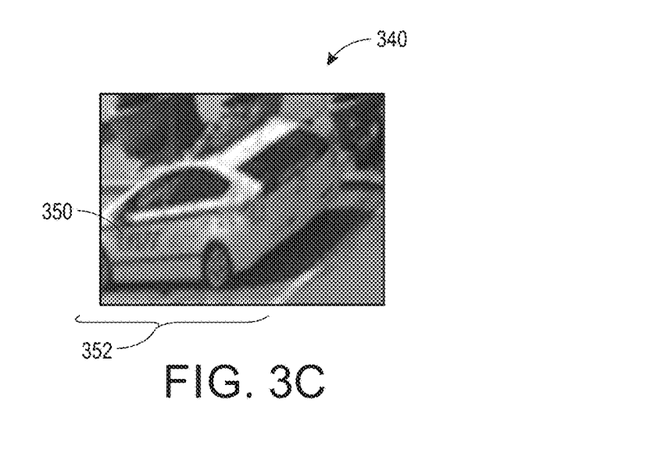

The method 100 may then include performing change detection via video analysis on the acquired video(s) to collect "poorly-localized," unlabeled sample images the source domain, as at 104 in FIG. 1. FIGS. 3A, 3B, and 3C depict of "poorly-localized," unlabeled sample images 300, 320, 340 from the source domain, according to one or more embodiments disclosed. More particularly, FIG. 3A depicts a "poorly-localized," unlabeled sample image 300 showing an empty a parking spot/stall 312. FIGS. 3B and 3C each depict a "poorly-localized," unlabeled sample image 320, 340 with an object (e.g., vehicle) 330, 350 in a parking spot/stall 332, 352. As may be seen, the sample images 300, 320, 340 in FIGS. 3A-3C are taken from different viewpoints. Although three sample images 300, 320, 340 are shown, it will be appreciated that more or fewer sample images may be acquired for use in the method 100. Here, the term "poorly-localized" is used to exaggerate the performance difference in localizing the object between using the change detection methods and using the vision-based trained classifier methods (current state-of-the-arts). In some limited settings, change detection methods may perform as well as vision-based trained classifier methods. However, in general they do not perform as well. Hence, the use of "poorly-localized."

As used herein, the term "change detection" refers to methods that detect spatial-temporal color/reflectance changes in a region of interest. Example methods are be discussed below. The sample images 300, 320, 340 in FIGS. 3A-3C are poorly-localized because video analysis may not yield accurate detection of the objects 330, 350, unlike the vision-based method. In addition, the sample images 300, 320, 340 are poorly-localized because the user may allow noises (e.g., distortion) to occur for ease of sample collection.

As used herein, the term "unlabeled" refers to a sample image that has not been analyzed by a user to determine whether an object (e.g. vehicle) is present. Thus, a sample image is "labeled" when a user either determines that an object is present in the sample image (i.e., yes or positive), or an object is not present in the sample image (i.e., no or negative).

The images 300, 320, 340 may be collected from the video using a background-subtraction ("BGS") technique. Here, BGS is an example of a change detection algorithm, as discussed above. It may proceed as follows. First, a background is estimated using a method such as temporal averaging across frames or Gaussian mixed models that are known in the art of video processing. Then, the "change" or the foreground in the current frame is identified as those pixels whose values are sufficiently different from the estimated background (e.g., the absolute differences between the values in current frame and the estimated background frame are greater than a threshold). Other methods for collecting the images 300, 320, 340 from the video may also be used including color-based or motion-based change detection. Because the objects 330, 350 are vehicles, the collected sample images 300, 320, 340 may include views that at least partially include a parking spot/stall 312, 332, 362 where a vehicle may be parked. Once acquired, the sample images 300, 320, 340 may be localized and labelled by a user to train the classifier in the source domain.

Figure 4:
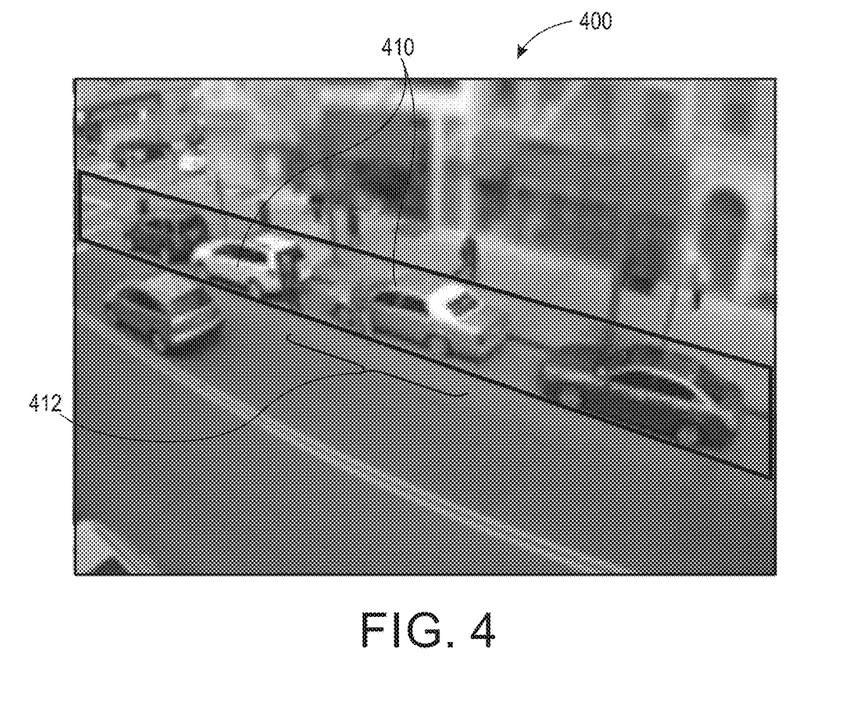
FIG. 4 depicts an illustrative image of a target domain where the vision-based object detection system will be used, according to one or more embodiments disclosed.

The method 100 may also include acquiring one or more videos of a target domain (e.g., deployment site) where the vision-based object detection system will be used, as at 106. FIG. 4 depicts an illustrative image 400 of a target domain (e.g., deployment site) where the vision-based object detection system will be used, according to one or more embodiments disclosed. The target domain (e.g., deployment site) may be or include a different location or view of on-street parking than the one shown in the source domain (e.g. training site) of FIG. 2.

Figure 5A:
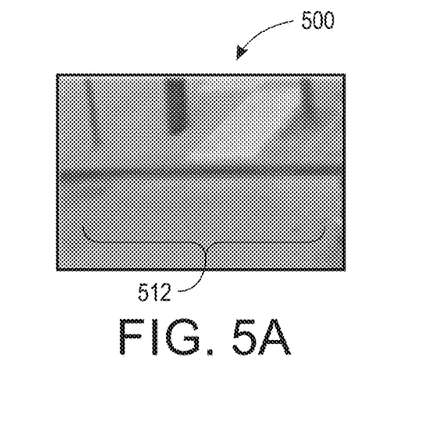
FIGS. 5A, 5B, and 5C depict illustrative images of "poorly-localized," unlabeled sample images from the target domain, according to one or more embodiments disclosed.
Figure 5B:
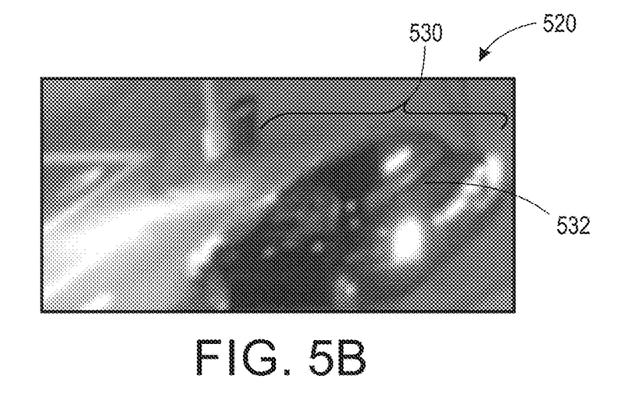
Figure 5C:
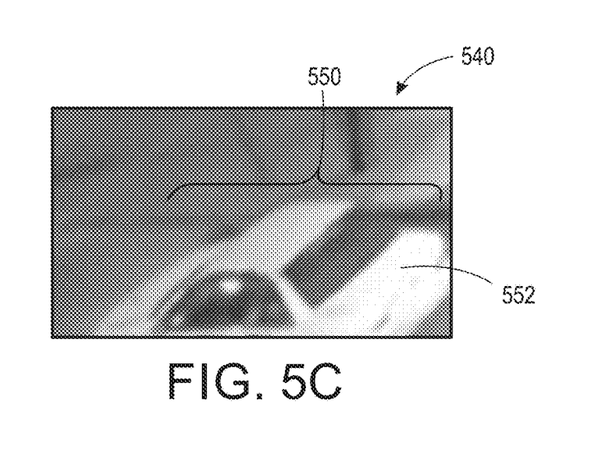

The method 100 may also include performing change detection via video analysis on the acquired video(s) to collect "poorly-localized," unlabeled sample images from the target domain, as at 108 in FIG. 1. FIGS. 5A, 5B, and 5C depict "poorly-localized," unlabeled sample images 500, 520, 540 from the target domain, according to one or more embodiments disclosed. More particularly, FIG. 5A depicts a "poorly-localized," unlabeled sample image 500 showing an empty a parking spot/stall 512. FIGS. 5B and 5C each depict a "poorly-localized," unlabeled sample image 520, 540 with an object (e.g., vehicle) 530, 550 in a parking spot/stall 532, 552. As may be seen, the sample images 500, 520, 540 in FIGS. 5A-5C are taken from different viewpoints. Although three sample images 500, 520, 540 are shown, it will be appreciated that more or fewer sample images may be acquired for use in the method 100.

Step 108 may include the same unsupervised sample collection that was used at the source domain. More particularly, the same technique for collecting the sample images 500, 520, 540 (e.g., BGS) may be used for both the source domain and the target domain so that the error sources may be similar.

The method 100 may then include determining domain adaptation parameters on one or more domain shift properties between the poorly-localized, unlabeled sample images 300, 320, 340 collected from the source domain and the poorly-localized, unlabeled sample images 500, 520, 540 collected from the target domain, as at 110 in FIG. 1. As used herein, the term "domain adaptation parameter" refers to parameter(s) that is/are used for performing the domain adaptation. For example, a domain adaptation parameter may be or include a matrix that transforms the feature space in the source domain to the feature space in the target domain, another example, a domain adaptation parameter may be or include a matrix that transforms the SVM classifier in the source domain to the SVM classifier in the target domain. In these examples, the matrix may serve as a way to scale, rotate, and/or translate the feature space or classifier in the source domain to better fit them in the target domain. The domain adaptation parameter may also be or include parameters in a pre-selected functional form such as the coefficients of a polynomial, a radial-based Gaussian (kernel) etc. In short, domain adaptation parameters are the parameters corresponding to the functional form that are chosen to perform the adaptation on the feature space or classifier from the source domain to the target domain. As used herein, the term "domain shift property" refers to a property that describes the discrepancy or change from the source domain to the target domain. For example, if the domain change is caused by a rotation of the imaging, the domain shift property may be characterized by a rotation. For such case, using a rotation matrix as the domain adaptation parameter may serve well in performing the domain adaptation. The choice of the type of domain adaptation parameter may dictate the type of domain shift that may be addressed. The "domain adaptation parameter" and the "domain shift property" are thus coupled in most domain adaptation methods. An example selection of a domain adaptation parameter that is well suited in addressing a domain shift due to a change of poses or scene of the imaging is discussed below.

In step 110, data distributions in the object/background of interest in the source and target domains may be used to determine the domain adaptation parameters based on the domain shift properties between the poorly-localized, unlabeled sample images 300, 320, 340 collected from the source domain and the poorly-localized, unlabeled sample images 500, 520, 540 collected from the target domain. This may be used to enable unsupervised domain adaptation.

In at least one embodiment, each poorly-localized, unlabeled sample image 300, 320, 340, 500, 520, 540 may be converted to its corresponding histogram oriented gradient ("HOG") features (e.g., a 1×M vector). $D_S$ may be the data set of the HOGs of the source domain sample images 300, 320, 340, and $D_T$ may be the data set of the HOGs for the target domain sample images 500, 520, 540. The domain shift may be estimated by performing principal component analysis ("PCA") on $D_S$ and $D_T$ to find their corresponding low-rank sub-spaces $P_S$ & $P_T$ and their orthogonal complementary sub-spaces $R_S$ & $R_T$, and calculating domain shift matrix G. There exist many other methods or techniques for mapping sub-spaces for the source and target domain such as projective subspace, manifold etc. They may be used to characterize domain shift matrix G as well. Thus, the method 100 disclosed herein is not limited by PCA or the formulation discussed above.

Figure 6:
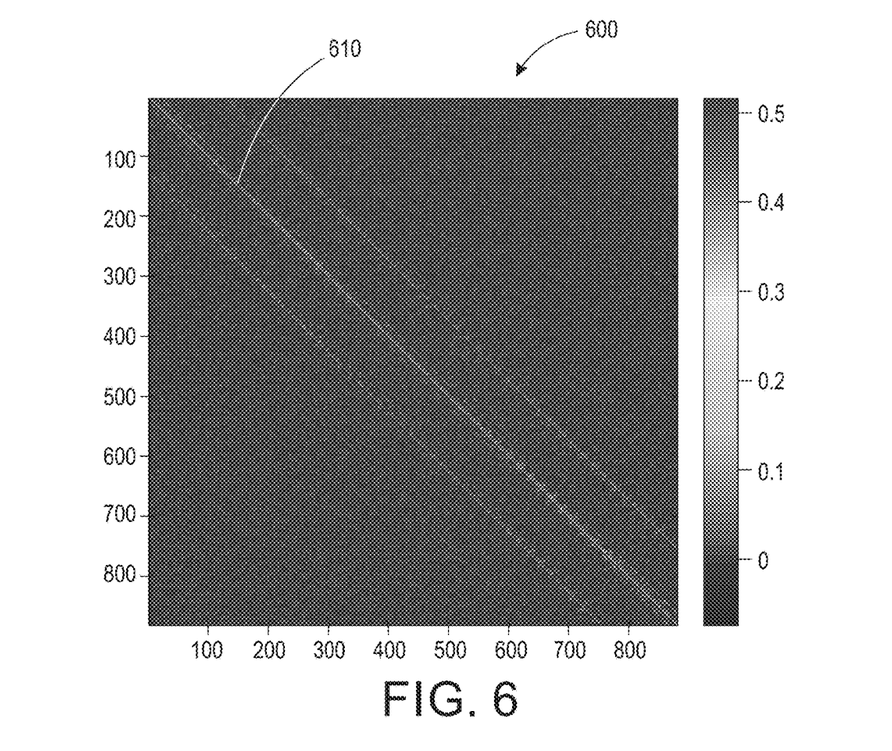
FIG. 6 depicts an illustrative intensity of a G matrix calculated from the collected sample images with the threshold of preserving 90% energy in the low-rank sub-spaces according to one or more embodiments disclosed.

FIG. 6 depicts an illustrative intensity of the G matrix calculated from the collected sample images 300, 320, 340, 500, 520, 540 with the threshold of preserving 90% energy in the low-rank sub-spaces, according to one or more embodiments disclosed. As shown, the domain shift for this particular target domain (and its corresponding application) may be centered mostly along the diagonal/off-diagonal entries 610. This indicates that the major shifts occur in only a few directions in the high-dimensional spaces. This happens to be the case in the example provided herein since the domain shift is mainly contributed from moderate change of camera pose. This characteristic is not required for ensuring good domain adaptation for the method 100. As long as the domain shift may be veil characterized by the G matrix (regardless the shape of G), the domain adaptation method 100 may yield accurate results.

The method 100 may then include deriving a target domain (e.g., deployment site) vision-based object detector via the unsupervised domain adaptation, as at 112 in FIG. 1. The source domain classifier may be adapted based upon G to become a target domain classifier and, thus, may be used for vision-based object detection in the target domain. G may be used to expand the feature space so that the source domain classifier may be adapted for the target domain classifier. The data sets $D_S$ and $D_T$ may be cropped. Then, G may be used to model the domain shift (e.g., rotation) rather than to expand the feature space for the target domain. More particularly, a linear support vector machine ("SVM") may be used as the classifier for both the source domain and the target domain, and G may be used to rotate the classification hyper-plane of the SVM in the source domain to that of the target domain. In other words, (W, b) may be the linear weighting vector and bias, respectively, and (W', b') may be the new weighting vector and bias for the target domain. Given this, $$W'=WG \ \& \ b'=W(\mu_S-G\mu_T) \quad (1)$$

In Equation (1), $\mu_S$ & $\mu_T$ represent the sample means of the data set $D_S$ and $D_T$, respectively.

When collecting samples of objects 330, 350 in the source domain for vision-based methods, the difference between the categorization task and detection task is the additional need for accurate localization (i.e., cropping of positive samples). Due to the need for accurate localized sample images before a proper vision-based classifier is available, this task may be done manually. As a result, much research on unsupervised domain adaptation focuses on the categorization task. The method 100 disclosed herein bridges the gap for applying unsupervised domain adaptation for the detection task by utilizing unsupervised ways to collect poorly-localized samples, which may not work for unsupervised domain adaptation directly, and uses them indirectly to determine the domain shift. The domain shift may then be used to adapt the classifier.

The sample collection methods may work for environments where changes are dominated by a single object that enters or exits the scene. The method 100 uses unsupervised video processing/change detection to collect poorly-localized sample images and determines the domain-shift properties between source and target domains. The method 100 also uses the domain-shift properties indirectly, rather than directly, for unsupervised domain adaptation. The method 100 further determines a specific domain adaptation formula for a linear support vector machine.

Example

Figure 7:
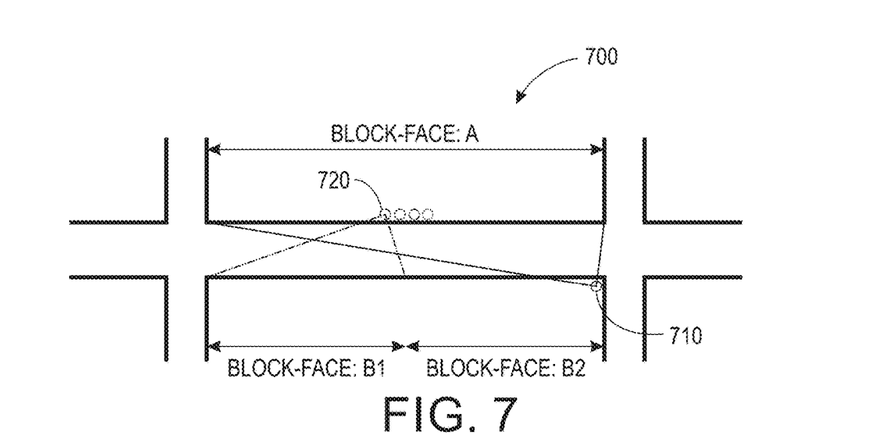
FIG. 7 depicts a schematic view of a street showing the cameras that were used to capture the images in FIGS. 2 and 4, according to one or more embodiments disclosed.

FIG. 7 depicts a schematic view of a street 700 showing the cameras 710, 720 that were used to capture the images 200, 400 in FIGS. 2 and 4, respectively, according to one or more embodiments disclosed. As shown, the cameras 710, 720 were positioned on opposite sides of the street 700. The first camera 710 was used to capture the parking occupancy on block face A, which was used as the source domain. The second camera 720 was used to capture the parking occupancy on block face B1, which was used as the target domain. As the views are not symmetrical, the background on one side of the street 700 (as viewed from the first camera 710) is different from the background on the other side of the street 700 (as viewed from the second camera 720).

A global HOG-SVM classifier for parked vehicle detection was trained using the image(s) 300, 320, 340 from the first camera 710 and then used to analyze 30 days of videos from the second camera 720 without any adaptation. There were, however, some normalization steps that were done in the target domain so that the performance was reasonably performed without adaptation. The results are shown in Table 1 below. The results using conventional UDA are shown in Row 1. The results using the UDA disclosed in method 100 are shown in Row 2. The conventional method and the method 100 were run using MATLAB® with real-time performance. Row 3 shows the difference (e.g., improvement) between Rows 1 and 2.

TABLE 1

|  |  | $M_O$ | $M_O^{(0)}$ | $M_O^{(1)}$ |
| --- | --- | --- | --- | --- |
| Row 1 | Results without UDA | 90% | 72% | 92% |
| Row 2 | Results with UDA | 94% | 79% | 99% |
| Row 3 | Improvement | 4% | 7% | 7% |

Several days of video were selected from the source domain and the target domain for collecting poorly-localized samples, and then the method 100 proceeded as discussed above. The number of days of video selected varied such that a sufficient number of poorly-localized samples was collected in both domains. In the example, the source domain (captured by the first camera 710) covered up to 8 parking spots and is busier than the target domain. It took 2 days to collect enough sample images from the source domain. As the target domain was less busy, it took 6 days to a comparable number of sample images. As may be seen in Row 3 the method 100 yielded results that were 4%-7% better than the results achieved with the conventional method.

$M_O$ represents the average accuracy of the occupancy for each individual parking spot/stall. $M_O^{(d)}$ represents the fraction of time that the block occupancy is within d-error. Here, d is a non-negative integer. For example, $M_O^{(0)}$ (i.e., d=0) represents the fraction of time that the block occupancy determined by the classifier is correct (i.e., has 0 error). In another example, $M_O^{(1)}$ (i.e., d=1) represents the fraction of time that the block occupancy determined by the classifier is within one error (i.e., has no more than 1 error). Using a complete independent event assumption for a block with 4 stalls, the occupancy accuracy for the individual stalls must be 94.6% to achieve an 80% accuracy for $M_O^{(0)}$.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 8:
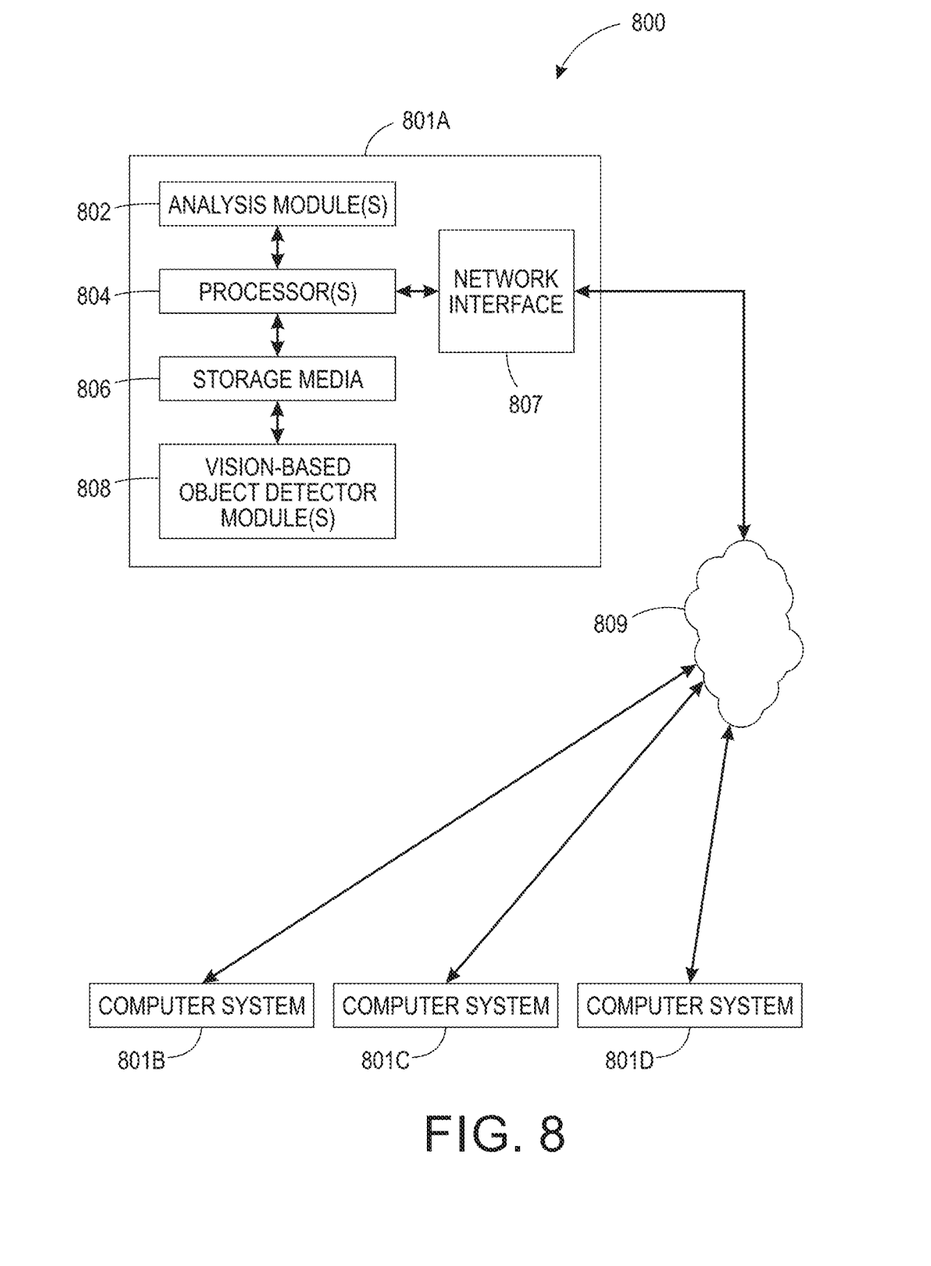
FIG. 8 depicts a computing system for performing the et hod disclosed herein, according to one or more embodiments disclosed.

In some embodiments, the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis modules 802 that are configured to perform various tasks according to some embodiments, su h as one or more methods (e.g., method 100) disclosed herein. To perform these various tasks, the analysis module 802 executes independently, or in coordination with, one or more processors 804, which is (or are) connected to one or more storage media 806A. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor can include a microprocessor, microcontroller, processor module or subsystem, programmable integrated circuit, programmable gate array, or another control or computing device.

The storage media 806 can be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801 and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above can be provided on one computer-readable or machine-readable storage medium, or in other embodiments, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, the computing system 800 may include one or more vision-based object detector modules 808 that may perform at least part of the method 100. It should be appreciated that computing system 800 is one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, aspects of the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases.

Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for detecting an object, comprising:
acquiring a first video of a source domain where a vision-based object detector is trained;
performing change detection on the first video to collect one or more first localized, unlabeled sample images from the source domain;
acquiring a second video of a target domain where the vision-based object detector is used;
performing change detection on the second video to collect one or more second localized, unlabeled sample images from the target domain;
determining a domain adaptation parameter based on one or more domain shift properties between the one or more first localized, unlabeled sample images from the source domain and the one or more second localized, unlabeled sample images from the target domain, wherein determining the domain adaptation parameter comprises converting the one or more first localized, unlabeled sample images from the source domain into corresponding histogram oriented gradient features; and
adapting the vision-based object detector to be used for object detection in the target domain based on the domain adaptation parameter, wherein adapting the vision-based object detector comprises using a linear support vector machine as a classifier for the source domain and the target domain, wherein W'=WG and b'=W ($\mu_S$–G$\mu_T$), and wherein:
W' represents a linear weighting vector for the target domain,
W represents a linear weighting vector for the source domain,
G represents a domain shift matrix,
b' represents a bias for the target domain,
$\mu_S$ represents a sample means of a data set of the histogram oriented gradient features of the one or more first localized, unlabeled sample images from the source domain, and $\mu_T$ represents a sample means of a data set of the histogram oriented gradient features of the one or more second localized, unlabeled sample images from the target domain.

2. The method of claim 1, wherein the object comprises a vehicle, and wherein the source domain, the target domain, or both comprise a street, a parking lot, or a parking garage.

3. The method of claim 1, wherein the object comprises a person, and wherein the source domain, the target domain, or both comprise a classroom.

4. The method of claim 1, wherein performing change detection on the first video comprises using a background-subtraction technique, using motion detection, or using color change detection.

5. The method of claim 1, wherein the target domain comprises a different location than the source domain.

6. The method of claim 1, wherein the domain adaptation parameter comprises a matrix that transforms a feature space in the source domain into a feature space in the target domain or a matrix that transforms a classifier in the source domain into a classifier in the target domain.

7. The method of claim 1, wherein determining the domain adaptation parameter further comprises:
performing principal component analysis on the histogram oriented gradient features to identify one or more sub-spaces; and
calculating the domain shift matrix using the one or more sub-spaces.

8. The method of claim 1, further comprising rotating a classification hyper-plane of the linear support vector machine in the source domain to the target domain using the domain shift matrix.

9. A non-transitory computer-readable medium storing instructions that, when executed by at least one processor of a computing system, cause the computing system to perform operations, the operations comprising:
acquiring a first video of a source domain where a vision-based object detector is trained;
performing change detection on the first video to collect one or more first localized, unlabeled sample images from the source domain;
acquiring a second video of a target domain where the vision-based object detector is used;
performing change detection on the second video to collect one or more second localized, unlabeled sample images from the target domain;
determining a domain adaptation parameter based on one or more domain shift properties between the one or more first localized, unlabeled sample images from the source domain and the one or more second localized, unlabeled sample images from the target domain, wherein determining the domain adaptation parameter comprises converting the one or more first localized, unlabeled sample images from the source domain into corresponding histogram oriented gradient features; and
adapting the vision-based object detector to be used for object detection in the target domain based on the domain adaptation parameter, wherein adapting the vision-based object detector comprises using a linear support vector machine as a classifier for the source domain and the target domain, wherein W'=WG and b'=W ($\mu_S$−G$\mu_T$), and wherein:
W' represents a linear weighting vector for the target domain,
W represents a linear weighting vector for the source domain,
G represents a domain shift matrix,
b' represents a bias for the target domain,
$\mu_S$ represents a sample means of a data set of the histogram oriented gradient features of the one or more first localized, unlabeled sample images from the source domain, and
$\mu_T$ represents a sample means of a data set of the histogram oriented gradient features of the one or more second localized, unlabeled sample images from the target domain.

10. The non-transitory computer-readable medium of claim 9, wherein determining the domain adaptation parameter further comprises:
performing principal component analysis on the histogram oriented gradient features to identify one or more sub-spaces; and
calculating the domain shift matrix using the one or more sub-spaces.

11. The non-transitory computer-readable medium of claim 9, wherein the operations further comprise rotating a classification hyper-plane of the linear support vector machine in the source domain to the target domain using the domain shift matrix.

12. A computing system comprising:
one or more processors; and
a memory system comprising one or more non-transitory computer-readable media storing instructions that, when executed by at least one of the one or more processors, cause the computing system to perform operations, the operations comprising:
acquiring a first video of a source domain where a vision-based object detector is trained;
performing change detection on the first video to collect one or more first localized, unlabeled sample images from the source domain;
acquiring a second video of a target domain where the vision-based object detector is used;
performing change detection on the second video to collect one or more second localized, unlabeled sample images from the target domain;
determining a domain adaptation parameter based on one or more domain shift properties between the one or more first localized, unlabeled sample images from the source domain and the one or more second localized, unlabeled sample images from the target domain, wherein determining the domain adaptation parameter comprises converting the one or more first localized, unlabeled sample images from the source domain into corresponding histogram oriented gradient features; and
adapting the vision-based object detector to be used for object detection in the target domain based on the domain adaptation parameter, wherein adapting the vision-based object detector comprises using a linear support vector machine as a classifier for the source domain and the target domain, wherein W'=WG and b'=W ($\mu_S$−G$\mu_T$), and wherein:
W' represents a linear weighting vector for the target domain,
W represents a linear weighting vector for the source domain,
G represents a domain shift matrix,
b' represents a bias for the target domain,
$\mu_S$ represents a sample means of a data set of the histogram oriented gradient features of the one or more first localized, unlabeled sample images from the source domain, and $\mu_T$ represents a sample means of a data set of the histogram oriented gradient features of the one or more second localized, unlabeled sample images from the target domain.

13. The computing system of claim 12, wherein determining the domain adaptation parameter further comprises:
    performing principal component analysis on the histogram oriented gradient features to identify one or more sub-spaces; and
    calculating the domain shift matrix using the one or more sub-spaces.

14. The computing system of claim 12, wherein the operations further comprise rotating a classification hyperplane of the linear support vector machine in the source domain to the target domain using the domain shift matrix.

* * * * *